United States Patent
Borlick et al.

(10) Patent No.: US 10,466,751 B2
(45) Date of Patent: Nov. 5, 2019

(54) SUPPLEMENTAL POWER DISTRIBUTION VOLTAGE STABILIZATION

(71) Applicant: International Business Machines Corporation, Armonk, NY (US)

(72) Inventors: Matthew G. Borlick, Tucson, AZ (US); Brian J. Cagno, Tucson, AZ (US); John C. Elliott, Tucson, AZ (US); Lokesh M. Gupta, Tucson, AZ (US); Karl A. Nielsen, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 213 days.

(21) Appl. No.: 15/437,385

(22) Filed: Feb. 20, 2017

(65) Prior Publication Data
US 2018/0239414 A1  Aug. 23, 2018

(51) Int. Cl.
*G06F 3/06* (2006.01)
*G06F 1/18* (2006.01)
*G06F 1/26* (2006.01)

(52) U.S. Cl.
CPC ............ *G06F 1/189* (2013.01); *G06F 1/26* (2013.01); *G06F 1/263* (2013.01)

(58) Field of Classification Search
CPC ..... G06F 1/26; G06F 1/32; G06F 3/06; G06F 1/263; G06F 1/189
See application file for complete search history.

(56) References Cited

U.S. PATENT DOCUMENTS

| | | | |
|---|---|---|---|
| 6,737,763 B2 | 5/2004 | Liu et al. | |
| 2012/0243160 A1 | 9/2012 | Nguyen et al. | |
| 2014/0108846 A1* | 4/2014 | Berke | G06F 1/263 713/340 |
| 2014/0229748 A1* | 8/2014 | Li | G06F 1/26 713/300 |
| 2016/0011650 A1* | 1/2016 | Yang | G06F 1/263 713/323 |
| 2016/0365155 A1* | 12/2016 | Kim | G06F 13/4081 |

* cited by examiner

*Primary Examiner* — Fahmida Rahman
(74) *Attorney, Agent, or Firm* — Nelson and Nelson; Daniel P. Nelson; Alexis V. Nelson

(57) ABSTRACT

A method for providing stable and reliable power to electronic devices is disclosed. In one embodiment, such a method includes providing a backplane having several power supplies coupled thereto. The method further provides connectors to connect multiple power-consuming devices, such as storage drives, expansion cards, memory expansion cards, or the like, to the backplane. In certain embodiments, the backplane provides a data transfer path and shared power distribution to the power-consuming devices. In the event a power supply is electrically decoupled from the backplane, the method enables a supplemental power-supplying device to supply power to the backplane by way of one of the connectors. A corresponding system is also disclosed.

9 Claims, 7 Drawing Sheets

SUPPLEMENTAL POWER DISTRIBUTION VOLTAGE STABILIZATION

BACKGROUND

Field of the Invention

This invention relates to systems and methods for providing stable and reliable power to electronic devices.

Background of the Invention

A redundant power distribution system may be used in situations where high reliability and nearly continuous availability of power is important. A redundant power distribution system may be designed such that two or more power supplies simultaneously provide electrical power to a power distribution network. This power distribution network may, in turn, provide power to one or more power-consuming devices. In the event a power supply coupled to the power distribution network fails, the remaining power supply or supplies may increase power output and/or maintain voltage on the network within specified limits.

In a redundant power distribution system such as that described above, it is difficult to ensure that a power supply does not have latent defects that only become evident when another power supply in the power distribution system is shut off, is removed, or fails. For example, if a power supply is removed from the power distribution system, the other power supplies may unexpectedly fail to maintain voltage or current in the power distribution system as intended. The failure may be the result of a sudden shift of load, resulting in voltage excursions beyond required regulation, or could be due to an inability of the remaining power supplies to source sufficient current. Voltage excursions beyond specified limits or shutdowns of power supplies may interrupt system operation. This behavior is especially problematic for planned component exchanges that are intended to be performed during normal operations since power is believed to be fully redundant.

In view of the foregoing, what are needed are systems and methods to provide stable and reliable power to electronic devices, even in situations where power supplies contain latent defects.

SUMMARY

The invention has been developed in response to the present state of the art and, in particular, in response to the problems and needs in the art that have not yet been fully solved by currently available systems and methods. Accordingly, the invention has been developed to provide stable and reliable power to electronic devices even in situations where power supplies contain latent defects. The features and advantages of the invention will become more fully apparent from the following description and appended claims, or may be learned by practice of the invention as set forth hereinafter.

Consistent with the foregoing, a method for providing stable and reliable power to electronic devices is disclosed. In one embodiment, such a method includes providing a backplane having several power supplies coupled thereto. The method further provides connectors to connect multiple power-consuming devices, such as storage drives, expansion cards, memory expansion cards, or the like, to the backplane. In certain embodiments, the backplane provides a data transfer path and shared power distribution to the power-consuming devices. In the event a power supply is electrically decoupled from the backplane, the method enables a supplemental power-supplying device to supply power to the backplane by way of one of the connectors.

A corresponding system is also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
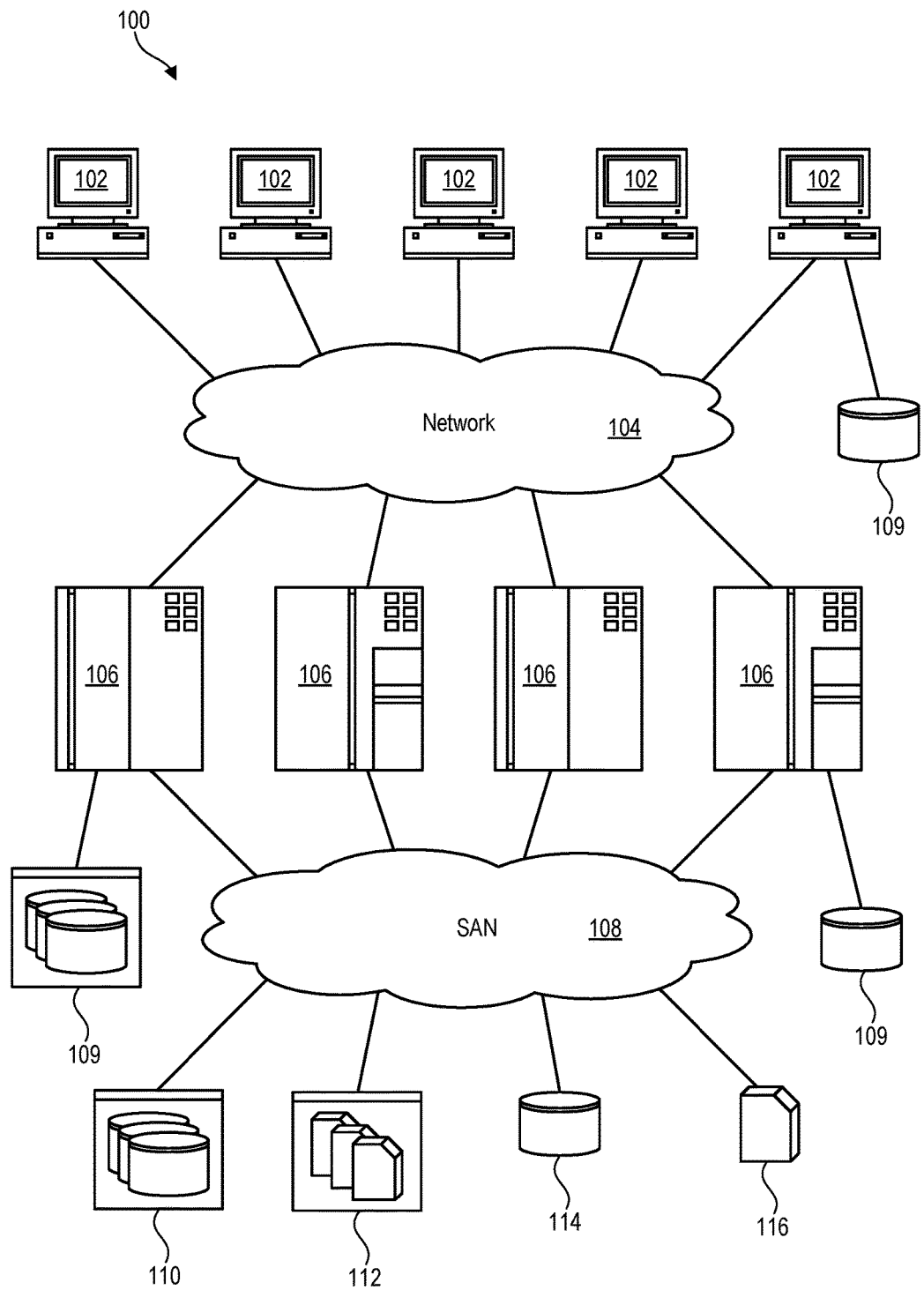
FIG. 1 is a high-level block diagram showing one example of a network environment in which a supplemental power-supplying device in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented only by way of example and not limitation. Indeed, the systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 109 (e.g., arrays of hard-disk drives, solid-state drives, tape drives, etc.). These computers 102, 106 and direct-attached storage systems 109 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 112, individual hard-disk drives 114 or solid-state drives 114, tape drives 116, CD-ROM libraries, or the like. To access a storage system 110, 112, 114, 116, a host system 106 may communicate over physical connections from one or more ports on the host 106 to one or more ports on the storage system 110, 112, 114, 116. A connection may be through a switch, fabric, direct connection, or the like. In certain embodiments, the servers 106 and storage systems 110, 112, 114, 116 may communicate using a networking standard such as Fibre Channel (FC).

Figure 2:
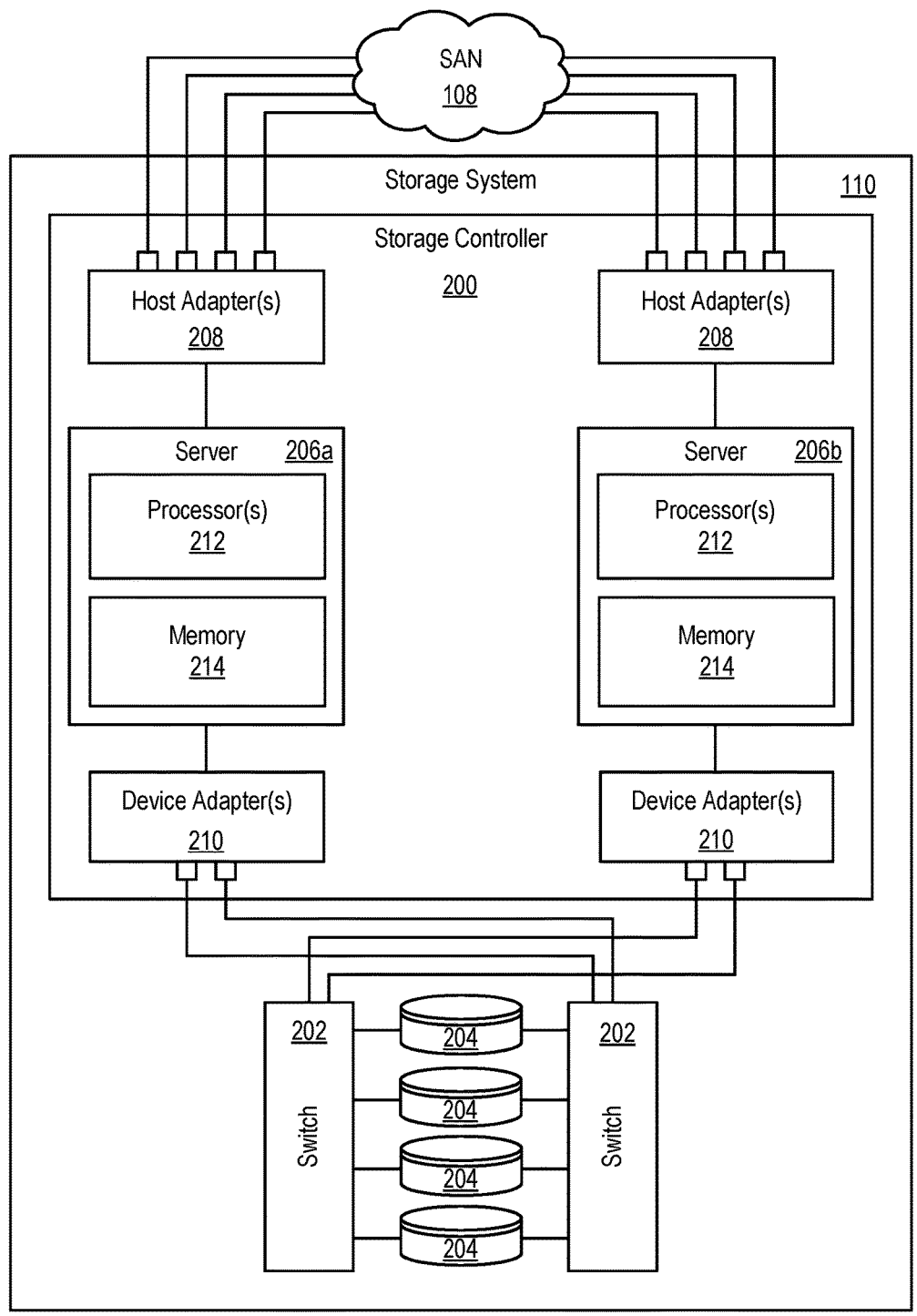
FIG. 2 is a high-level block diagram showing one example of a storage system in which a supplemental power-supplying device may be implemented.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Figure 3:
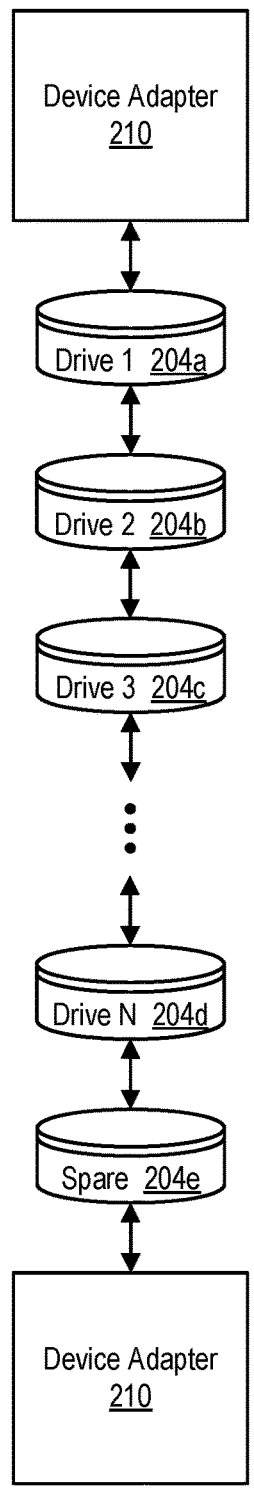
FIG. 3 is a high-level block diagram showing a scenario where several device adapters supply power to a plurality of storage drives.

Referring to FIG. 3, in certain embodiments, storage drives 204 such as those illustrated in FIG. 2 may be daisy-chained (connected together in a linear series) between a pair of device adapters 210. The device adapters 210 and the daisy-chained configuration may function as a backplane that provides or distributes power to each of the storage drives 204. The device adapters 210 and daisy-chained configuration may also provide a data transfer path to and from each of the storage drives 204. Because the storage drives 204 are connected to each of the device adapters 210, the device adapters 210 may function as redundant power supplies to the storage drives 204. Thus, if one of the device adapters 210 were to fail, the other device adapter 210 may continue to provide electrical power and a data transfer path to the storage drives 204.

As further shown in FIG. 3, in certain embodiments the storage drives 204 may provide an array of storage drives 204a-d that may be configured in a RAID (redundant array of independent disks). Data may be distributed across the storage drives 204a-d in accordance with a selected RAID level. In certain embodiments, one or more spare storage drives 204e may be provided in the event a storage drive 204a-d in the RAID fails, is anticipated to fail, or needs to be replaced. In such cases, the spare storage drive 204e may be used to replace the failed or failing storage drive 204a-d to become part of the RAID. Data may be copied over to or rebuilt on the spare storage drive 204e so that it may be integrated into the RAID.

In certain cases, a power supply in a redundant power distribution system may need to be replaced or serviced. For example, in the embodiment illustrated in FIG. 3, assume that one of the device adapters 210 needs to be serviced and, to accomplish such, needs to be electrically decoupled (e.g., disconnected, shut down, removed, etc.) from the backplane during the service period. In such a situation, it may be difficult to ensure that the other device adapter 210 does not have latent defects that only become evident when the other device adapter 210 is electrically decoupled from the backplane (e.g., wiring and conductive elements that provide electrical power to the storage drives 204). For example, if a device adapter 210 is electrically decoupled from the backplane, the other device adapter 210 may, due to latent defects, fail to maintain voltage or current to the storage drives. This may cause an interruption of operation that disrupts access to the storage drives 204.

Figure 4:
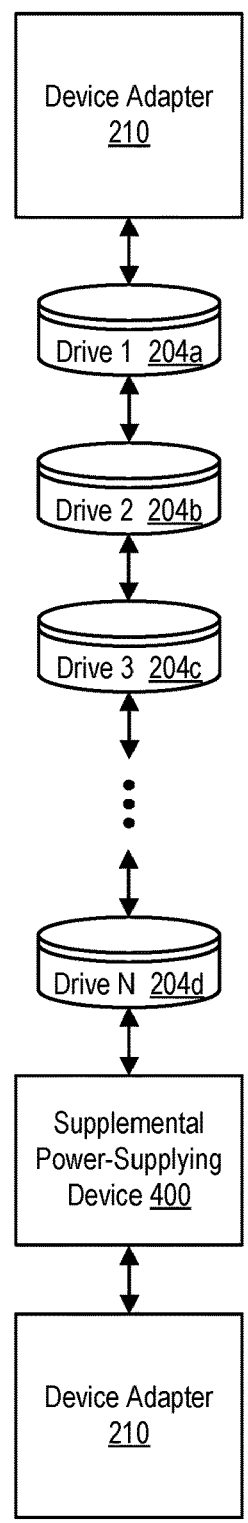
FIG. 4 is a high-level block diagram showing a supplemental power-supplying device in place of a spare storage drive.

Referring to FIG. 4, in order to provide stable and reliable power to the storage drives 204a-d when one of the device adapters 210 is electrically decoupled from the backplane, even in situations where the other device adapter 210 contains latent defects, a supplemental power-supplying device 400 may be provided. The supplemental power-supplying device 400 may be inserted in place of one of the storage drives 204 or in an empty slot or connector configured to receive a storage drive 204. Ideally, the supplemental power-supplying device 400 is used to replace a spare storage drive 204 since the spare storage drive 204 is not currently being used and may be removed with no or little disruption to other active storage drives 204a-d. A maintenance or repair procedure may then be performed on the device adapter 210 requiring service.

During the maintenance or repair procedure, the supplemental power-supplying device 400 may assist the other device adapter 210 in maintaining current and/or voltage on the backplane. If the other device adapter 210 has a latent defect that renders it unable to maintain current and/or voltage to the storage drives 204 on its own, the supplemental power-supplying device 400 may prevent the latent defect from becoming evident and/or maintain current and/or voltage to the storage drives 204 even if the latent defect manifests itself. In essence, the supplemental power-supplying device 400 temporarily maintains redundancy in the redundant power distribution system even when a normal power supply (a device adapter 210 in this example) is electrically decoupled from the backplane for maintenance, repair, or replacement. Once the maintenance, repair, or replacement procedure is performed and a normal power supply (e.g., device adapter 210) is re-coupled to the backplane, the supplemental power-supplying device 400 may be removed from the slot or connector that couples it to the backplane. The supplemental power-supplying device 400 may then be used again when needed either on the same or another system 110.

Depending on system requirements, the supplemental power-supplying device 400 may be as simple as a series of capacitors between voltage and ground that are charged up to a distribution voltage when the supplemental power-supplying device 400 is plugged into a card or device slot. Electrically, these capacitors may provide decoupling to filter power plane fluctuations (e.g., ripple). They may also provide a stored charge that will support a voltage for a short period of time in the event power from the remaining power supplies is disrupted or temporarily altered. A more elaborate design of the supplemental power-supplying device 400 may include a power source and regulator to supply more current to the backplane in the event voltage or current on the backplane fluctuates during a maintenance procedure.

Figure 5:
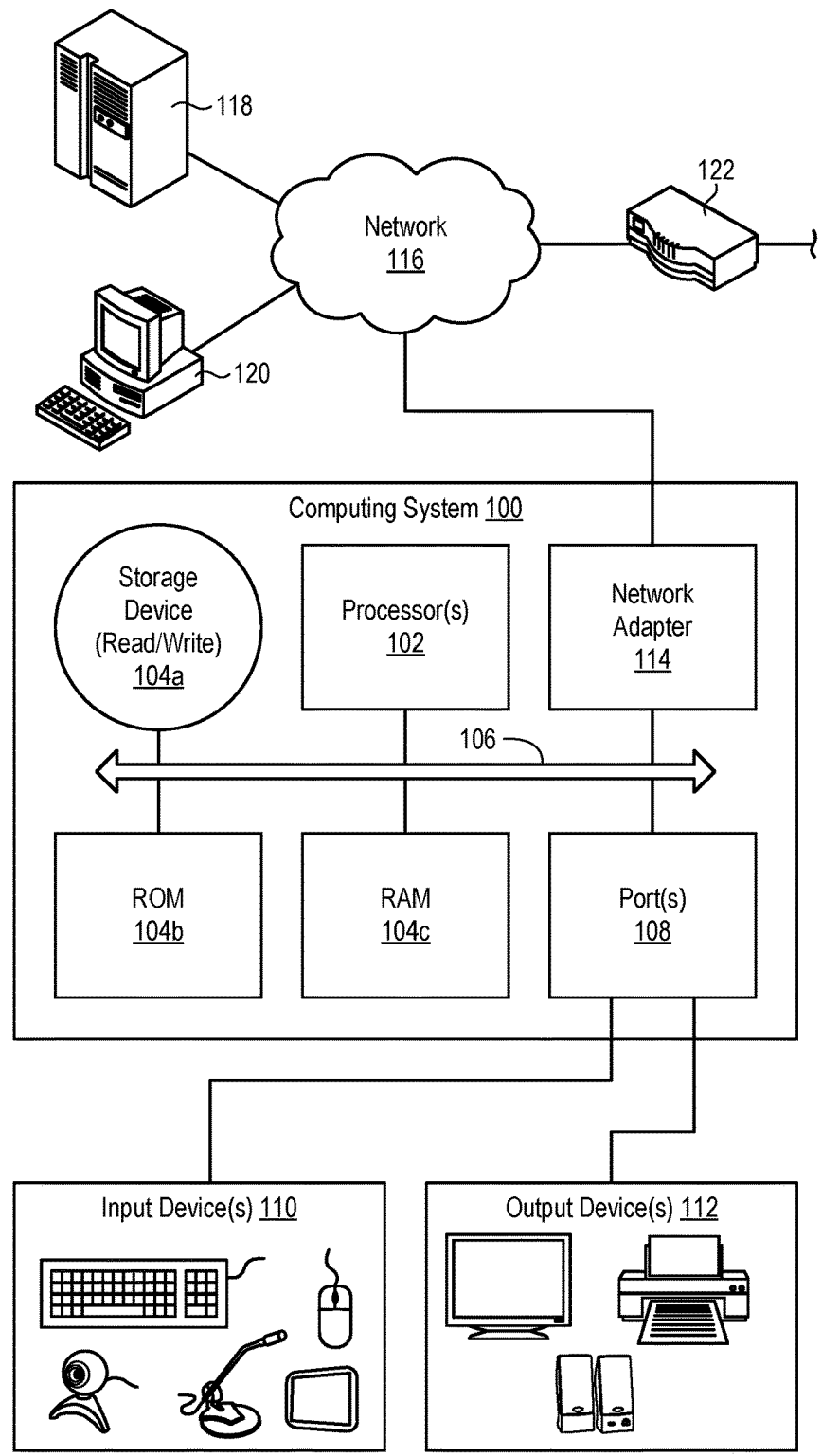
FIG. 5 is a high-level block diagram showing an alternative environment in which a supplemental power-supplying device in accordance with the invention may be implemented.

Referring to FIG. 5, a supplemental power-supplying device 400 in accordance with the invention may also be used in other types of computing environments. For example, a supplemental power-supplying device 400 in accordance with the invention may be used in a computing system 100 such as that illustrated in FIG. 5. Such a computing system 100 may be embodied as a desktop computer, a workstation, a server, or the like. The computing system 100 is presented by way of example and is not intended to be limiting. Indeed, the supplemental power-supplying device 400 disclosed herein may be applicable to a wide variety of different computing systems in addition to the computing system 100 shown.

As shown, the computing system 100 includes at least one processor 102 and may include more than one processor 102. The processor 102 may be operably connected to a memory 104. The memory 104 may include one or more non-volatile storage devices such as hard drives 104*a*, solid state drives 104*a*, CD-ROM drives 104*a*, DVD-ROM drives 104*a*, tape drives 104*a*, or the like. The memory 104 may also include non-volatile memory such as a read-only memory 104*b* (e.g., ROM, EPROM, EEPROM, and/or Flash ROM) or volatile memory such as a random access memory 104*c* (RAM or operational memory). A bus 106, or plurality of buses 106, may interconnect the processor 102, memory devices 104, and other devices to enable data and/or instructions to pass therebetween.

To enable communication with external systems or devices, the computing system 100 may include one or more ports 108. Such ports 108 may be embodied as wired ports 108 (e.g., USB ports, serial ports, Firewire ports, SCSI ports, parallel ports, etc.) or wireless ports 108 (e.g., Bluetooth, IrDA, etc.). The ports 108 may enable communication with one or more input devices 110 (e.g., keyboards, mice, touchscreens, cameras, microphones, scanners, storage devices, etc.) and output devices 112 (e.g., displays, monitors, speakers, printers, storage devices, etc.). The ports 108 may also enable communication with other computing systems 100.

In certain embodiments, the computing system 100 includes a wired or wireless network adapter 114 to connect the computing system 100 to a network 116, such as a LAN, WAN, or the Internet. Such a network 116 may enable the computing system 100 to connect to or communicate with one or more servers 118, workstations 120, personal computers 120, mobile computing devices, or other devices. The network 116 may also enable the computing system 100 to connect to or communicate with another network by way of a router 122 or other device 122. Such a router 122 may allow the computing system 100 to communicate with servers, workstations, personal computers, or other devices located on different networks.

Figure 6:
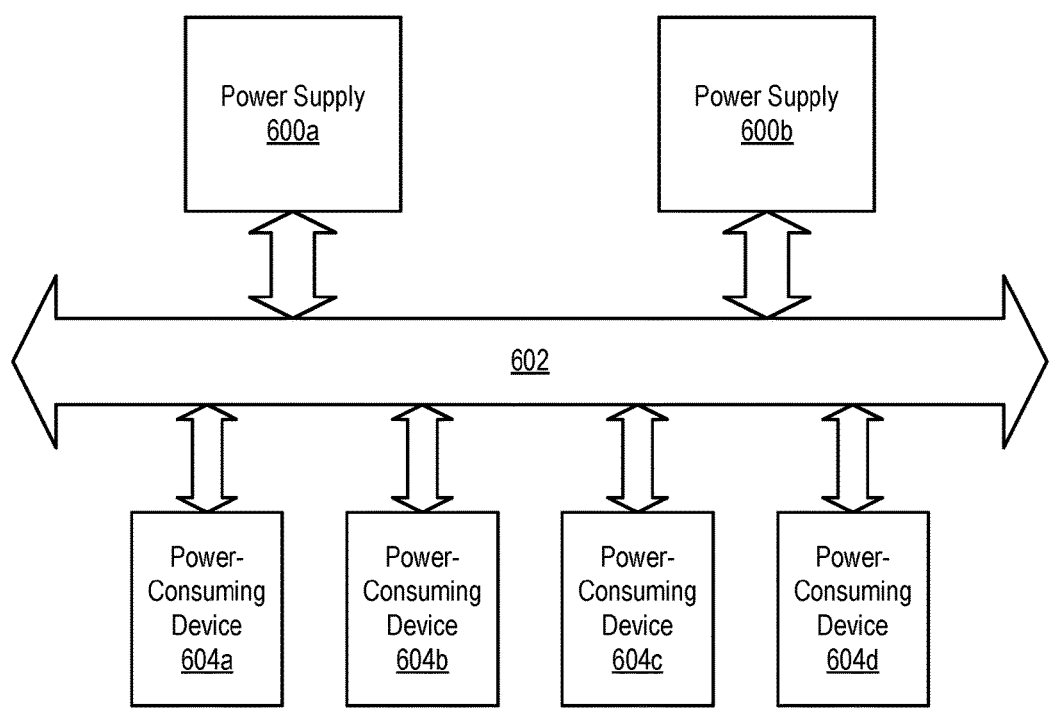
FIG. 6 is a high-level block diagram showing a scenario where several power supplies supply power to a plurality of power-consuming devices.

Referring to FIG. 6, in certain embodiments, a computing system 100 like that illustrated in FIG. 5 may include various planars 602 or backplanes 602 to provide power and/or a data transfer path to different power-consuming devices 604*a-d*. For example, a Peripheral Component Interconnect (PCI) bus 602 may include slots or connectors to attach different hardware devices 604*a-d* (i.e., PCI expansion cards) to the computing system 100. In addition to providing means for transferring data between the computing system 100 and the hardware devices 604*a-d*, the slots or connectors may supply power to the hardware devices 604*a-d*. One or more power supplies 600*a*, 600*b* may be coupled to the PCI bus 602 to supply power to the hardware devices 604*a-d*.

Figure 7:
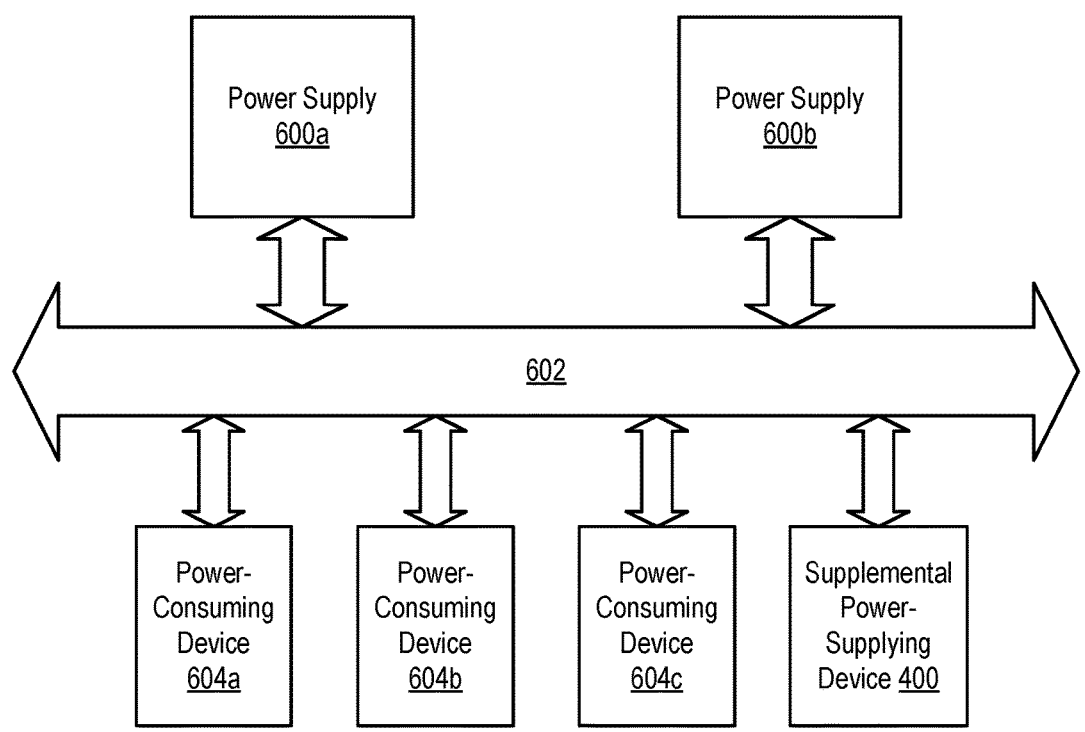
FIG. 7 is a high-level block diagram showing a supplemental power-supplying device in place of a power-consuming device.

Referring to FIG. 7, in certain embodiments, a supplemental power-supplying device 400 may be electrically coupled to the PCI bus 602 using one of the slots or connectors normally used to supply power to the power-consuming devices 604*a-d*. This supplemental power-supplying device 400 may be used to provide stable and reliable power to the PCI bus 602 even if a power supply 600 fails or is electrically decoupled from the PCI bus 602 for service or maintenance. In certain embodiments, the supplemental power-supplying device 400 is intended to be connected to the PCI bus 602 until it is needed. In other embodiments, the supplemental power-supplying device 400 is only temporarily connected when a power supply 600 needs to be removed or serviced. The supplemental power-supplying device 400 may then be disconnected from the bus 602 after the service is complete.

The supplemental power-supplying device 400 is not limited to the PCI bus example provided above and may be used with any type of planar 602 or backplane 602 used to provide power and/or a data transfer path to different power-consuming devices 604*a-c*. For example, memory array planars 602 that are used to expand an amount of memory in a computing system 100 may also take advantage of a supplemental power-supplying device 400 in accordance with the invention. In such embodiments, the supplemental power-supplying device 400 may be connected to a slot or connector configured to receive an additional memory expansion card. Any planar or backplane designed to provide redundant power to power-consuming devices 604 may benefit from a supplemental power-supplying device 400 in accordance with the invention.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for providing stable and reliable power to electronic devices during a repair and/or maintenance procedure, the method comprising:
   providing a plurality of storage drives daisy-chained together between a pair of power supplies; and
   performing a repair and/or maintenance procedure on a particular power supply of the pair of power supplies as follows:
      connecting a supplemental power-supplying device in place of one of the storage drives, the supplemental power-supplying device maintaining at least one of a desired voltage and current to the remaining storage drives while performing repair and/or maintenance on the particular power supply;
      performing the repair and/or maintenance on the particular power supply; and
      decoupling the supplemental power-supplying device from the remaining storage drives after the repair and/or maintenance is complete.

2. The method of claim 1, wherein connecting the supplemental power-supplying device in place of one of the storage drives comprises connecting the supplemental power-supplying device in place of a spare storage drive.

3. The method of claim 1, wherein performing the repair and/or maintenance on the particular power supply comprising decoupling the particular power supply from the storage drives to perform the repair and/or maintenance.

4. The method of claim 1, wherein performing the repair and/or maintenance on the particular power supply comprising recoupling the particular power supply to the storage drives after the repair and/or maintenance is complete.

5. The method of claim 1, wherein performing the repair and/or maintenance on the particular power supply comprises replacing the particular power supply.

6. The method of claim 1, wherein connecting the supplemental power-supplying device in place of one of the storage drives comprises connecting the supplemental power-supplying device to an empty slot configured to receive one of the storage drives.

7. The method of claim 1, wherein the daisy-chained configuration of the storage drives acts as a backplane to distribute power to each of the storage drives.

8. The method of claim 1, wherein the power supplies are device adapters.

9. The method of claim 1, wherein the storage drives are utilized in a RAID array having a specified RAID level.

* * * * *